United States Patent [19]

Adams et al.

[11] Patent Number: 5,340,488
[45] Date of Patent: Aug. 23, 1994

[54] COMPOSITION FOR CLEANING AN INTERNAL COMBUSTION ENGINE

[75] Inventors: Lawrence J. Adams, Ponte Verda Beach; Thomas R. Fruda, St. Augustine; Paul D. Hughett, Jacksonville, all of Fla.

[73] Assignee: Petro Chemical Products, Inc., Jacksonville, Fla.

[21] Appl. No.: 595,584

[22] Filed: Oct. 11, 1990

Related U.S. Application Data

[63] Continuation-in-part of Ser. No. 436,662, Nov. 15, 1989, Pat. No. 4,992,187.

[51] Int. Cl.$^5$ ............... C10M 133/46; C10M 133/26
[52] U.S. Cl. ................... 252/47.5; 252/50.49.3; 252/51.5 R; 44/340; 44/332; 44/432
[58] Field of Search ............ 252/50, 47.5, 49.3, 252/51.5 R; 44/412, 340, 432, 333; 134/20

[56] References Cited

U.S. PATENT DOCUMENTS

| | | | |
|---|---|---|---|
| 1,786,860 | 12/1930 | Midgley, Jr. et al. | 134/20 |
| 1,833,429 | 11/1931 | Lovell et al. | 134/20 |
| 1,958,744 | 5/1934 | Cross . | |
| 2,234,096 | 3/1941 | Leter et al. | 252/50 |
| 2,904,458 | 9/1959 | Dykstra et al. | 134/20 |
| 2,956,910 | 10/1960 | Giammaria | 134/20 |
| 2,971,828 | 2/1961 | Churchill et al. . | |
| 3,163,504 | 12/1964 | Calvino | 44/340 |
| 3,480,674 | 11/1969 | Miller, Jr. et al. | 252/50 |
| 3,702,299 | 11/1972 | Hartle et al. | 252/50 |
| 4,011,057 | 3/1977 | Sayers | 44/412 |
| 4,648,885 | 3/1987 | Reid | 44/432 |
| 4,666,529 | 5/1987 | Graiff . | |

FOREIGN PATENT DOCUMENTS 0147240 7/1985 European Pat. Off. .
0234753 9/1987 European Pat. Off. .

*Primary Examiner*—Jacqueline V. Howard
*Attorney, Agent, or Firm*—Lieberman & Nowak

[57] ABSTRACT

A composition is disclosed which cleans baked-on, carbonized sludges and varnish deposits from the internal surfaces of automobile, motorcycle and truck engines. The product comprises a mutually synergistic solution of selected cyclic compounds, aliphatic amines and water, preferably dissolved in a hydrocarbon or hydrocarbon and aliphatic lower alcohol fuel base. The solution or base product may be placed in a pressure resistant (aerosol) dispenser, and pressurized. When injected into an engine over a period of time, significant removal of deposited contaminants occurs, resulting in smooth and efficient engine operation and lower levels of unburned hydrocarbon fuel, carbon monoxide, and other air pollutants.

24 Claims, 6 Drawing Sheets

COMPOSITION FOR CLEANING AN INTERNAL COMBUSTION ENGINE

This application is a continuation-in-part of U.S. Ser. No. 436,662, filed Nov. 15, 1989, now U.S. Pat. No. 4,992,187 the contents of which are hereby incorporated by reference.

BACKGROUND OF THE INVENTION

New, clean internal combustion engines operate more efficiently than older ones that have accrued deposits of carbonized soil in the cylinder areas. They also produce less pollutant gases in the form of tailpipe emissions.

Functional problems of older engines have resulted in the use of highly refined gasoline/alcohol mixtures, detergent gasolines, computerized fuel injection systems, and in the marketing of engine injector solutions designed to solubilize offending carboniferous deposits. To combat pollution problems, costly catalytic converter equipment has been employed in a few countries. However, worsening smog conditions and related air pollution problems in metropolitan areas attest to the fact that these approaches are not entirely effective.

For many years there has been a search for engine additives that, when injected directly into the upper cylinder areas, would exert a profound cleaning effect and thus serve to remove carbonized varnishes and sludge deposits that form on spark plugs, fuel orifices, intake values, fuel injectors and cylinder walls. As these deposits inhibit the optimum burning of fuel, mile-per-gallon efficiency is reduced. Additionally, such deposits promote the generation of unburned hydrocarbons and partially burned pyrolysis products during combustion of gasolines and diesel fuels. These pyrolysis products include partially burned hydrocarbons (aliphatics, cyclics and aromatics), polycyclic alcohols, aldehydes and acids (sometimes carcinogenic), oxygenated hydrocarbons of other types, and poisonous carbon monoxide gas. These effluents are further oxidized by the catalytic converter, but significant amounts can escape, posing serious environmental hazards to humans, animals and crops. Environmental Protection Agency regulations under the Federal Clean Air Act have imposed severe limitations on airborne concentrations of these vapors and particulates. At this time, at least seventy counties and air quality management districts cannot comply with Federal regulations.

Tailpipe vapors chemically react with airborne nitrogen (II) oxide and indirectly cause the formation of excessive levels of tropospheric or ground-level ozone. Ozone is a strong irritant and possible proto-carcinogen that is directly implicated in smog formation.

A large number of tests have been made on automotive engines to determine such attributes as:

a. Dynamic firing voltages (kV).
 b. Specific exhaust gas concentrations (upstream from the catalytic converter) including:
  i. Unburned hydrocarbon vapors (ppm).
  ii. Carbon monoxide gas (ppm).
  iii. Oxygen gas (ppm).
  iv. Carbon dioxide gas (ppm).
 c. Minimum smooth idling speed (rpm).
 d. Increase in idling speed due to treatment (rpm).
 e. Engine smoothness at idling speed due to treatment. (Substantive)
 f. Degree of spark plug cleaning—by observation.
 g. Reliability of the CSPIT (Cold Spark Plug Immersion Test), as a predictive test method.

Tests results show that the CSPIT is a reliable predictive assay, removing about 90 per cent as much spark plug contaminants as are removed in the same time period by what is termed "The Hot Engine Cleaning Test" (HECT).

The cleaning ability and emission reduction properties of the subject compositions have been evaluated with those of other commercially available cleaners. They are significantly better. Although commercially available products make claims of improved engine performance and prolong the service life of catalytic converters, in fact they demonstrate very limited benefits. Consequently, the present market for the prior art products is small and static.

SUMMARY OF THE INVENTION

The subject invention provides a composition for dissolving organic matter which comprises (i) a hydrazine or an aliphatic amine, and (ii) a hydrocarbon or substituted hydrocarbon compound having a ring wherein at least one-half the atoms comprising the ring are carbon. The compound and the hydrazine or amine are compatible with each other and are capable of forming a homogeneous mixture. The subject invention also provides a pressurized dispenser which comprises an amount of hydrazine or an aliphatic amine and a gas propellant, as well as a method for using the same.

BRIEF DESCRIPTION OF THE FIGURES

FIG. 5 Residue removal at spark plugs after five minutes of treatment with formulae nos. 66, 67, or 68 which are composites of:

20% N-methyl-2-pyrrolidone
 10% Amine
 61% Mixed $C_{7-8}$ isoparaffinics
 9% Methyl t.butyl ether In formula 66 the amine is n.butylamine; in formula 67 the amine is isopropylamine; and in formula 68 the amine is diethylamine.

Type of sludge or deposit:
 A=Heavy crust of burned-on oil sludge
 B=Light crust of burned-on oil sludge
 C=Black, carbonized deposit of sludge
 Av.=Average removal (%) of above sludges.

Figure 6:
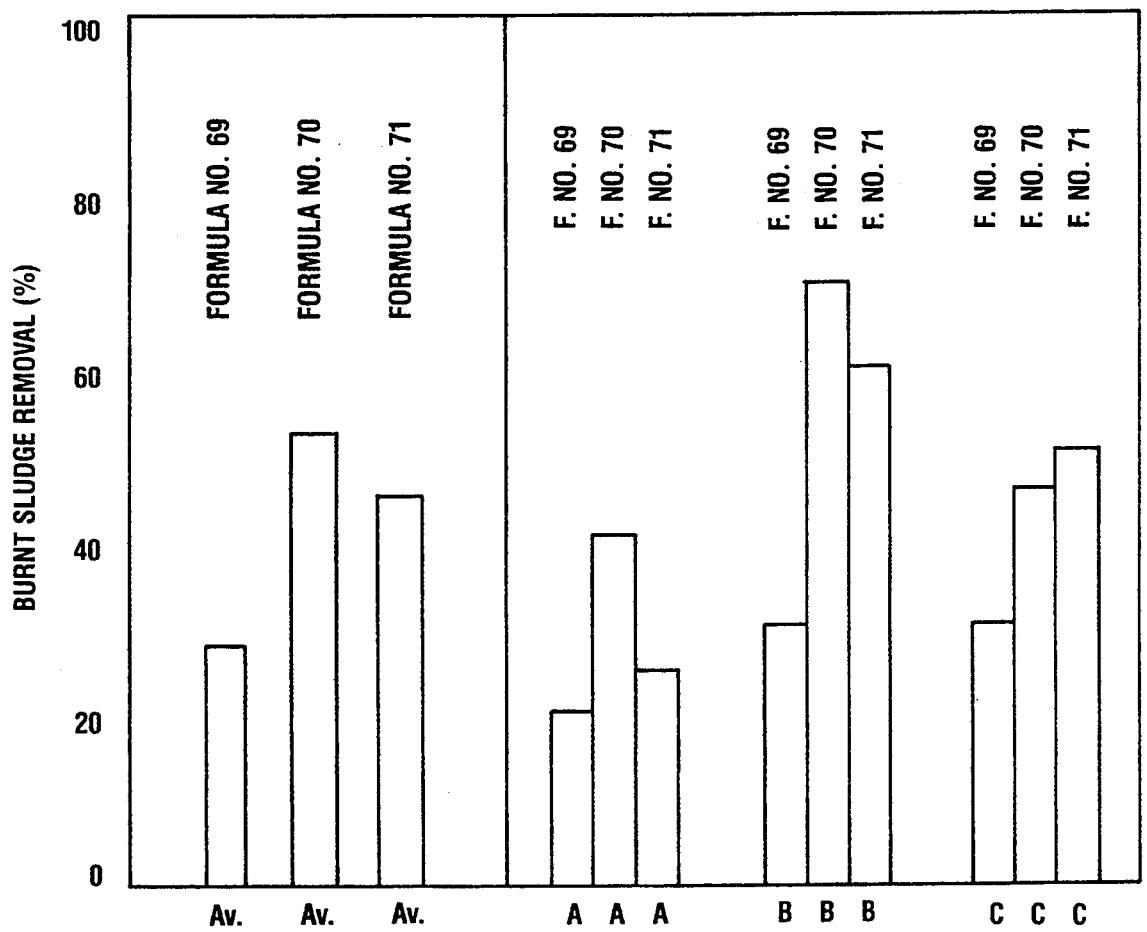

FIG. 6 Residue removal at spark plugs after five minutes of treatment with formulae nos. 69, 70, or 71 which are composites of:
21% N-methyl-2-pyrrolidone
5% Amine
65% mixed $C_{7-8}$ isoparaffinics
9% Methyl t.butyl ether In formula 69 the amine is n.butylamine; in formula 70 the amine is isopropylamine; and in formula 71 the amine is diethylamine.

Type of sludge or deposit:
A = Heavy crust of burned-on oil sludge
B = Light crust of burned-on oil sludge
C = Black, carbonized deposit of sludge
Av. = Average removal (%) of above sludges.

DETAILED DESCRIPTION OF THE INVENTION

The subject invention provides a composition for dissolving organic matter which comprises (i) a hydrazine or an aliphatic amine, and (ii) a hydrocarbon or substituted hydrocarbon compound having a ring wherein at least one-half the atoms composing the ring are carbon. The compound and the hydrazine or amine are compatible with each other and are capable of forming a homogeneous mixture. Typically, this compound comprises (i) a hydrazine (e.g. pure hydrazine, hydrated hydrazine or methylated hydrazine) or an aliphatic amine, and (ii) a ring-containing compound wherein the ring is composed of three, five or six atoms consecutively linked. The term "compatible" as used throughout the application is to include miscible, partially miscible, or immiscible components which can be made at least partially miscible by the use of an agent such as a surfactant, enzyme, catalyst, co-solvent, etc.

Typically, the subject composition is used for dissolving varnish and burned-on sludge in an internal combustion engine. The term "internal combustion engine" as used throughout the subject application is to include not only the firing portion of the engine, but also ancillary engine areas. These areas include, but are not limited to, injectors; the plenum, including the intake manifold ducts, air throttle body, PVC valve, and cold start injector; engine intake housings and valve seat area; intake valves; combustion chamber components; and catalytic converter.

Generally, it is preferred that the subject composition has a boiling point greater than about 100° F., and that the atoms in the ring of the hydrocarbon or substituted hydrocarbon compound are carbon, nitrogen, oxygen, or sulfur. The compound may comprise straight or branched chains of atoms attached to an atom in the ring. One or more of the atoms in the ring may be substituted.

The following description of the subject invention has been set forth in terms of the preferred embodiment, i.e., where the organic material comprises varnish and burned-on sludge in an internal combustion engine. However, the subject compositions may also be utilized for a plethera of other applications. For example, the subject composition has been found to be extremely effective in dissolving bacteria, fungus, mold, and mildew such as those found within air conditioning units thereby removing stagnant odor associated with intermittently used units. Since the subject composition has a high pH and strong reducing properties, applications requiring these properties are also envisioned. Applications may also include the cleaning of carbonized materials such as those associated with hydrocarbon cracking and may also be used for removing carbon buildup from the valves and tips of acetylene, oxyacetylene, and other torches.

A multitude of two-component blends containing a hydrazine (e.g. pure, hydrated or methylated) and/or aliphatic amine and a ring containing hydrocarbon or substituted hydrocarbon compound have been tested. Many of these blends exhibit synergistic activity, allowing the removal of varnish/sludge deposits on spark plugs with outstanding speed and efficiency. In the case of the synergistic compositions, removal values for specific blends were substantially greater than would have been predicted from the removal values of the individual solvents. For example, a blend of 75% N-methyl-2-pyrrolidone and 25% n.butylamine showed 97 per cent removal of light, baked-on varnish/sludge deposits. However, only a 26 per cent removal would be predicted based upon a weighted average of the removal ratings of the pure components.

When synergistic pairs of components were incorporated into finished concentrates, the removal abilities of the concentrates appeared to be a close match to the predictable or theoretical value if no additional synergistic solvents were added. For example, a concentrate containing 25% of a synergistic blend with an 80 per cent removal rating might have a removal efficiency of 20 per cent if the diluent was a nonsynergistic solvent, such as an iso-octane/isopropanol blend.

During the testing, various hydrazine compounds (such as pure hydrazine, hydrazine hydrate or monomethyl hydrazine) and/or simple aliphatic amines were coupled with one of the following compounds:

| Ring Compound | Skeletal Structure |
| --- | --- |
| N-Methyl-2-pyrrolidone (M-Pyrol) | (5-membered ring: C-C-C-C-N with C=O, N-CH₃) |
| Tetrahydrofuran (THF) | (5-membered ring: C-C-C-C-O) |
| 4-Butyrolactone (gamma-Butyrolactone) | (5-membered ring: C-C-C-C-O with C=O) |
| Toluene | (benzene ring with CH₃) |
| 2-Pyrrolidone | (5-membered ring: C-C-C-C-N with C=O, N-H) |

-continued

| Ring Compound | Skeletal Structure |
|---|---|
| N-Vinyl-2-Pyrrolidone | 5-membered ring: C—C, C, N, C=O; N—CH=CH$_2$ |
| Furfurylamine | 5-membered ring: C—C, C, O, C—CH$_2$—NH$_2$ |
| Furfuryl Alcohol | 5-membered ring: C—C, C, O, C—CH$_2$—OH |
| 2-Methylimidazole | 5-membered ring: C—C, C, N, N—CH$_3$ |
| 3-Methyl-2-Oxazolidinone | 5-membered ring: C—N—CH$_3$, C, O, C=O |
| 2-Methyl-2-Oxazoline | 5-membered ring: C—N, C, O, C—CH$_3$ |
| 2-Methylaziridine | 3-membered ring: C—C—CH$_3$, N |
| Tetramethylene Sulfone | 5-membered ring: C—C, C, C, SO$_2$ |

Many of the above compounds are strong solvents. However, none individually were effective against burned-on varnishes. Each produced strong synergism with hydrazines and/or amines, at 5-15% amine or higher for the heterocyclics, and 20% or higher for the toluene/n.butylamine blend. Various combinations of a ring containing compound and a hydrazine and/or an aliphatic amine were found to be effective in removing coke and burned on sludge. For example, 75:25 weight percent mixtures of ring containing compound to hydrazine monohydrate showed excellent removal when the ring containing compound was N-methyl-2-pyrrolidone, 2-pyrrolidone-1-hydrate, 1-vinyl-2-pyrrolidone, furfurylamine and furfuryl alcohol.

N-methyl-2-pyrrolidone and n.butylamine demonstrated high varnish/sludge removal efficiency (to 97 per cent), and N-methyl-2-pyrrolidone and isopropylamine was almost as high (to 85 per cent) and was later found to be at least as effective as the N-methyl-2-pyrrolidone and n.butylamine couple when diluted into the finished concentrate.

In a preferred embodiment of the sueject invention, the composition for dissolving organic matter further comprises an amount of water effective to increase the dissolving of varnish and burned-on sludge. Most preferably, the water comprises less than about 4.0% of the composition when employing alkylamines, and less than about 15% when using hydrazine.

In order to gain the benefit of additional water, a simple co-solvent may be employed. Such co-solvents include methanol, ethanol, isopropanol and n.propanol. Isopropanol is preferred because it is non-poisonous, available without denaturants or payment of special taxes and is commercially available. At about 10 per cent or so of the final formula, isopropanol at least doubles the amount of water which may be incorporated into the concentrate without phase separation. It is also thought to aid in combustion (e.g. "gasohol" type blends are predominantly gasolines and ethanol).

It is recognized that all combinations of a hydrazine and/or simple aliphatic amines with a ring containing hydrocarbon or substituted hydrocarbon compound, such as three, five and six membered homocyclic or heterocyclic ring compounds, may not soluble. If they are not soluble, the inclusion of isopropanol or some other co-solvent may be necessary as a facilitating agent. For example, tetrahydrofuran is not compatible with hydrazine monohydrate. Accordingly, an alcohol or other solvent may be employed to increase the solubility of the compounds to be mixed. Such uses are included in the term "compatible".

It is preferred that the composition comprises an engine fuel. In optimally applying the teaching of the invention, a synergistic pair of cyclic and amine compounds is prepared, and to this is added about 50 per cent or more of iso-octanes or similar engine fuel. About 10 per cent of isopropanol or similar simple alcohol may then be added. Deionized water or aqueous ammonia may be added in an amount of about 1 to 4 per cent as the third member of synergistic varnish/sludge remover triad. This is best accomplished by completing a concentrate batch except for water addition, then removing about 10 per cent into a separate vessel. The main batch is then titrated with successive amounts of water or aqueous ammonia until incipient phase separation occurs, as evident by the liquid becoming hazy. After several minutes of further stirring, the haziness dissipates. At that point, the separated 10 per cent portion is added back in and the batch is complete.

In a preferred embodiment, the composition comprises a ring-containing compound and a hydrazine and/or an aliphatic amine in synergistic amounts.

Often it is preferred that the aliphatic amine is a low molecular weight amine, and that the amine comprises from about 5% to about 75% of the composition. More preferably, the amine is a $C_1$-$C_7$ primary amine, a secondary amine having $C_1$-$C_6$ branches, or a tertiary amine having $C_1$-$C_5$ branches.

It is particularly preferred that the amine is selected from the group consisting of n-butylamine, triethylamine, diethylamine, and isopropylamine; the hydrazine is selected from the group consisting of hydrazine, monomethyl hydrazine and hydrazine monohydrate; and the ring-containing compound is selected from the group consisting of N-methyl-2-pyrrolidone, furfurylamine 2-pyrrolidone hydrate, N-vinyl-2-pyrrolidone, furfuryl alcohol, 2-methylaziridine, tetramethylene sulfone, 2-methylimidazole, 3-methyl-2-oxazolidinone, 2-methyl-2-oxazoline, tetrahydrofuran, 4-butyrolactone, toluene, and xylene. Normally, the weight ratio of the ring-containing compound to the aliphatic amine is from 3:96 to 96:3.

Synergistic pairs of cyclic and simple amines and/or hydrazines also work fairly well without the need for added water or aqueous ammonia.

It has been found that synergism takes place between three, five and six membered single heterocyclic ring compounds, as well as six membered aromatic ring systems, when these materials are mixed with simple aliphatic amines, of $C_2$, $C_3$ and $C_4$ complexity, and/or a hydrazine (e.g. hydrazine, hydrazine monohydrate, or monomethyl hydrazine) at ratios that extend from about 3:96 to about 96:3, depending upon the particular blend.

Figure 1:
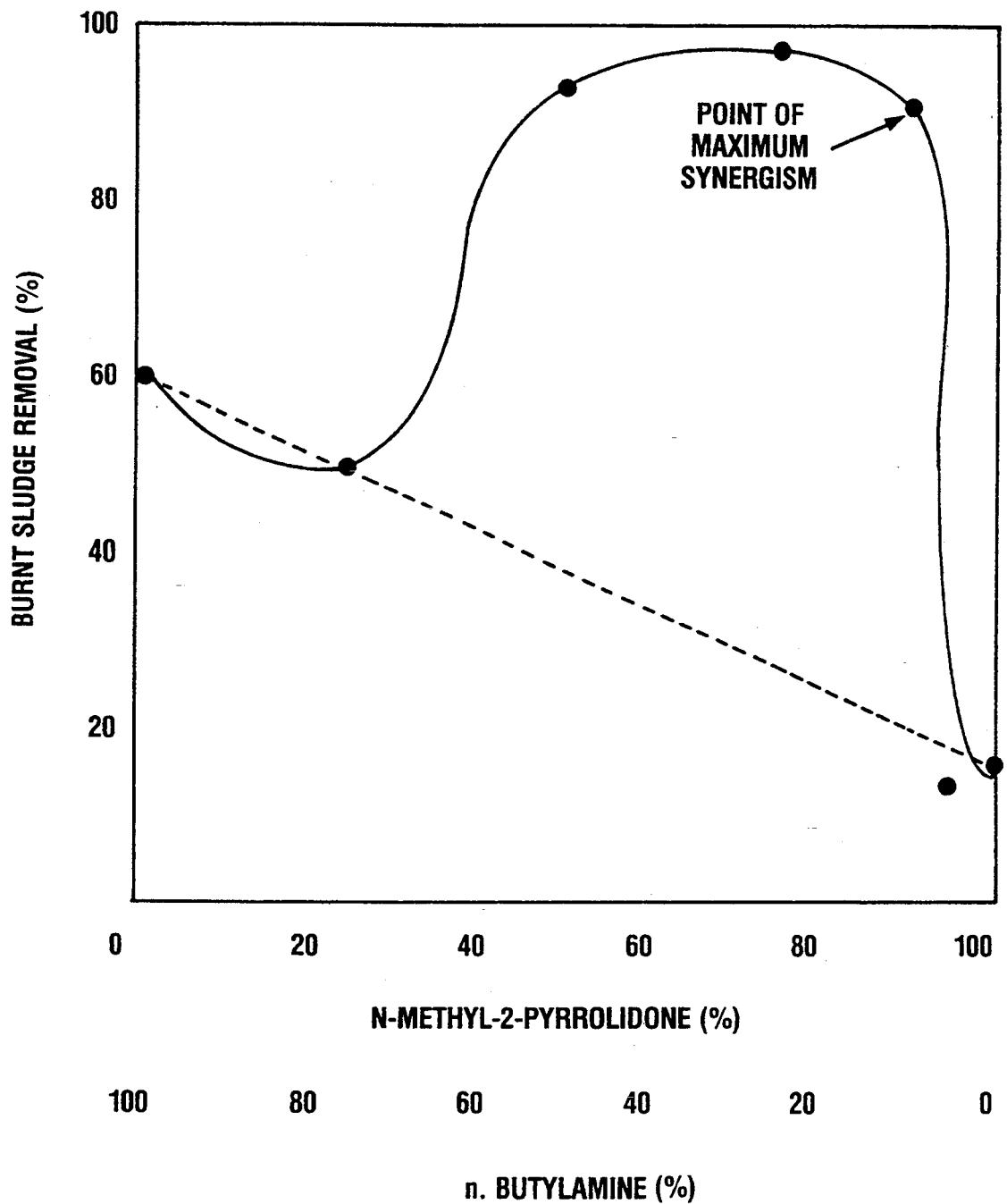
FIG. 1 Cleaning efficiency of N-methyl-2-pyrrolidone and n.butylamine blends on spark plug sludge in a five (5) minute test. The dashed line represents the theoretical (expected) curve. The solid line represents the actual (synergistic) curve.
Figure 2:
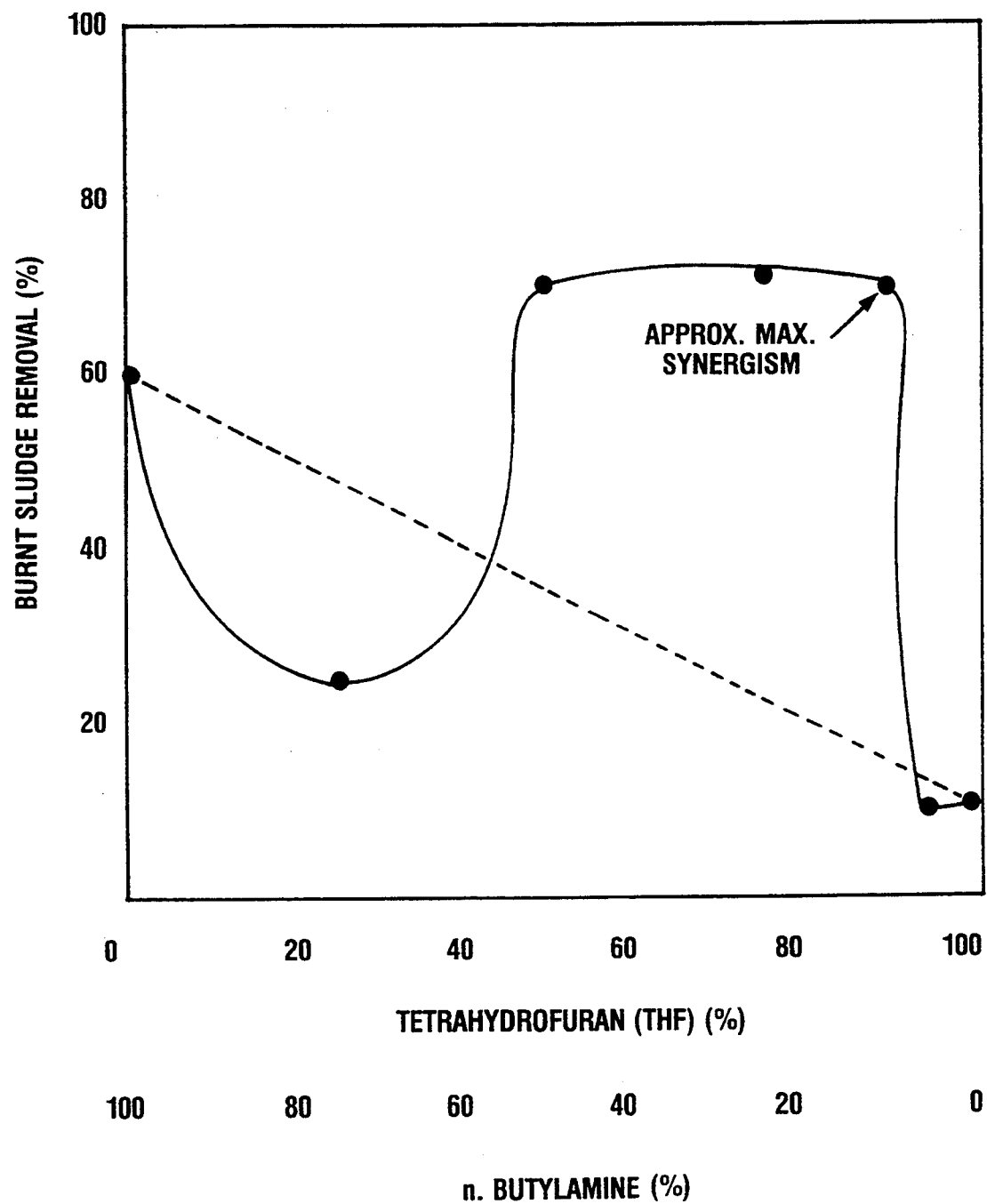
FIG. 2 Cleaning efficiency of tetrahydrofuran and n.butylamine blends on spark plug sludge in a five (5) minute test. The dashed line represents the theoretical (expected) curve. The solid line represents the actual (synergistic) curve.
Figure 3:
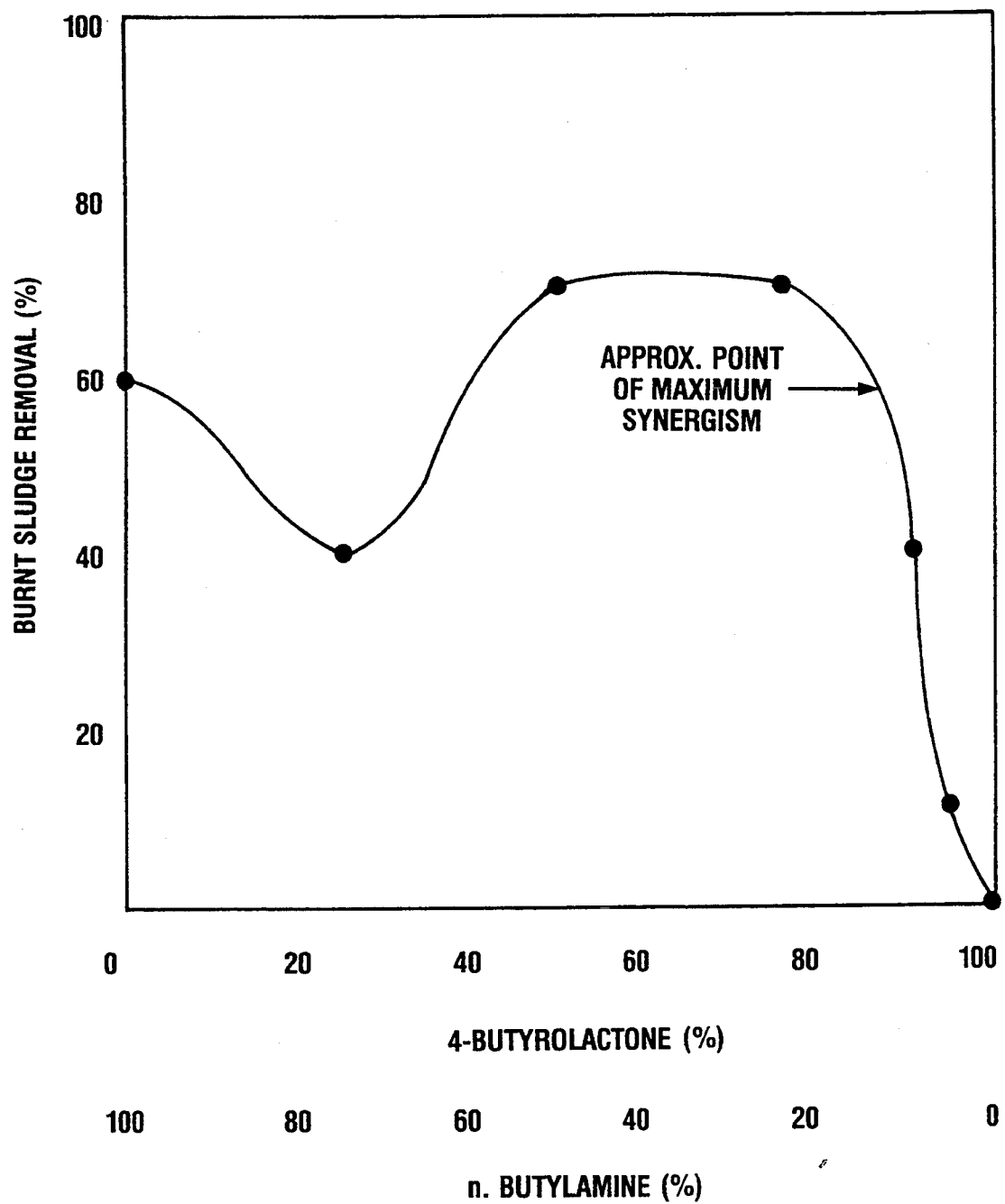
FIG. 3 Cleaning efficiency of 4-butyrolactone and n.butylamine blends on spark plug sludge in a five (5 ) minute test. The dashed line represents the theoretical (expected) curve. The solid line represents the actual (synergistic) curve.
Figure 4:
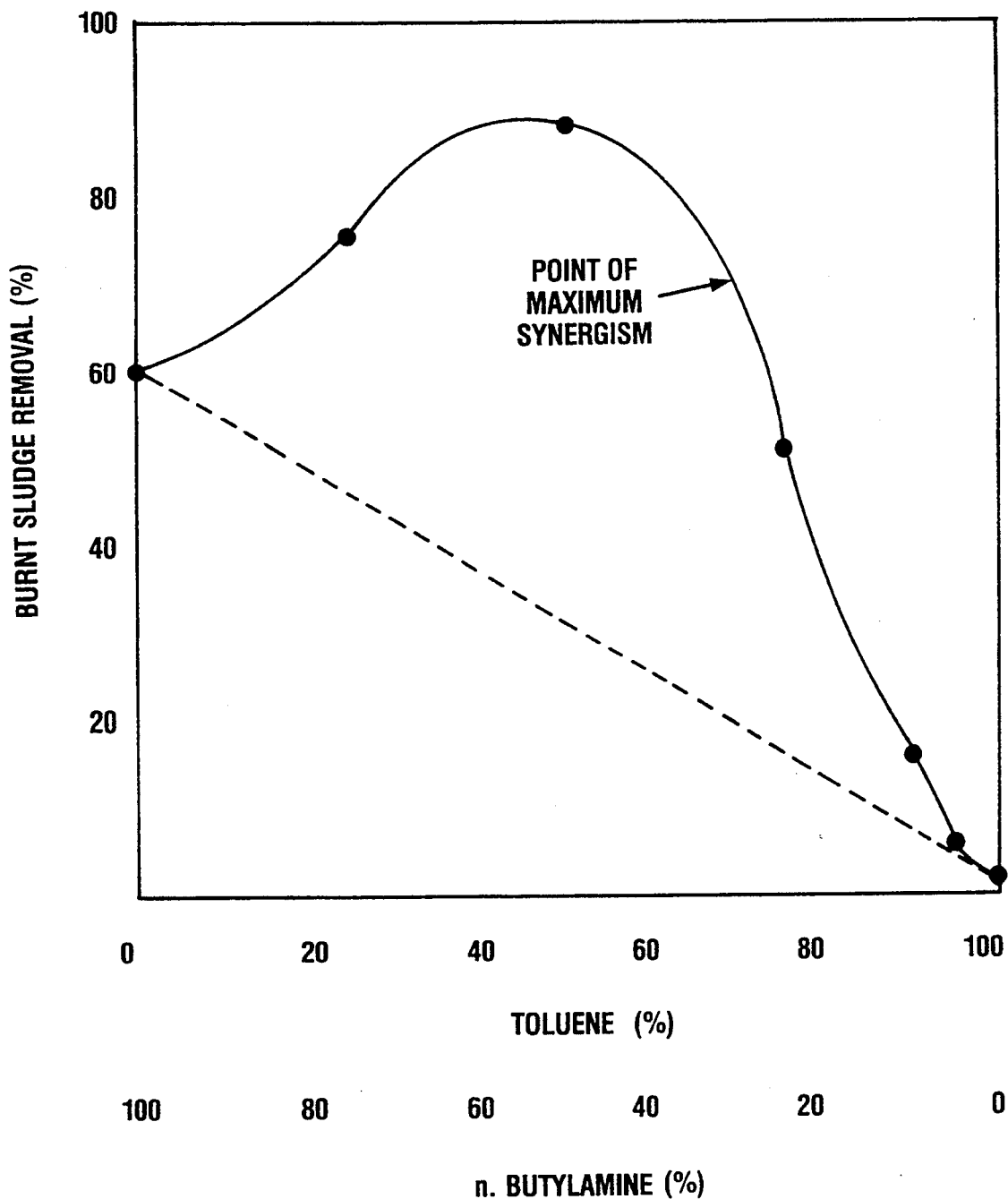
FIG. 4 Cleaning efficiency of toluene and n.butylamine blends on spark plug sludge in a five (5) minute test. The dashed line represents the theoretical (expected) curve. The solid line represents the actual (synergistic) curve.
Figure 5:
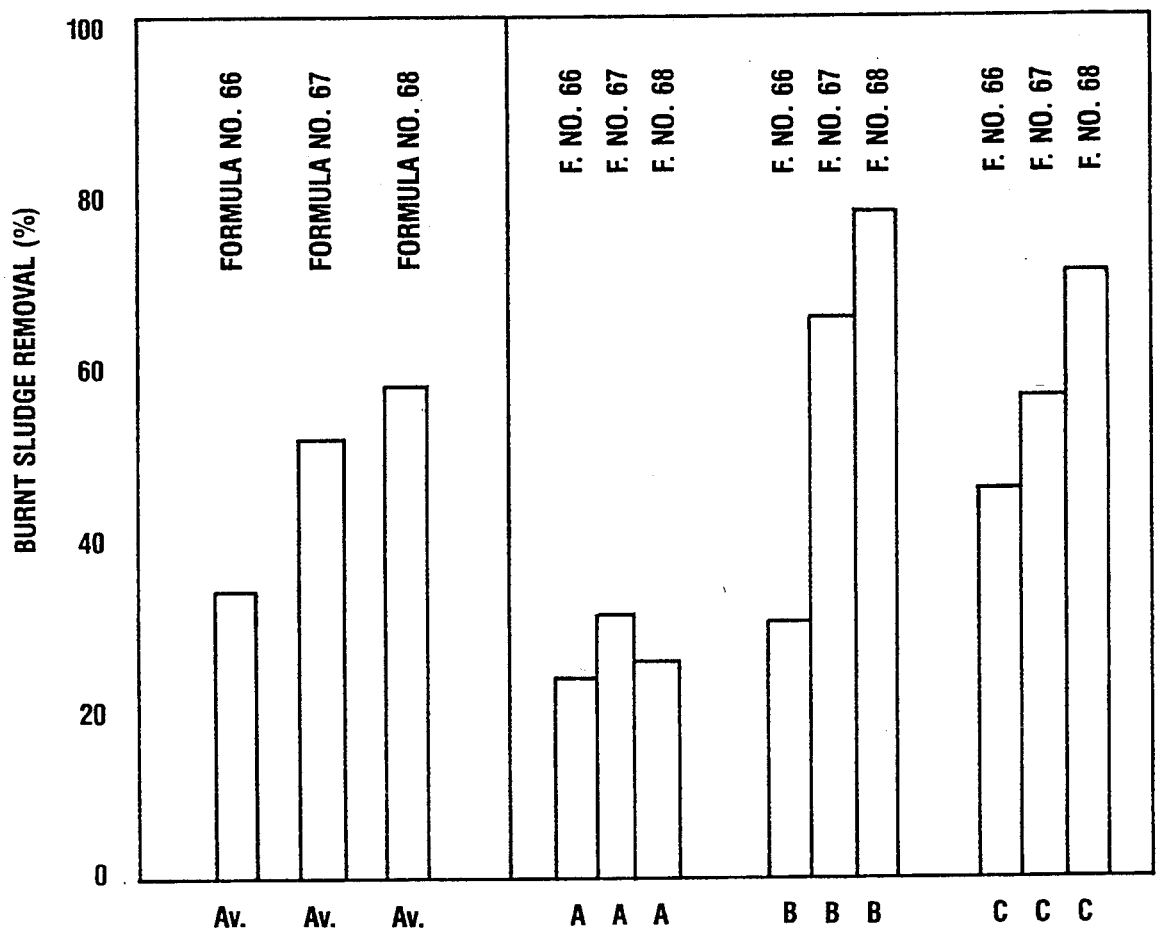

The synergistic effect of the N-methyl-2-pyrrolidone/n.butylamine couple and the N-methyl-2-pyrrolidone/diethylamine couple is presented in FIGS. 1 and 2.

Adding alkyl groups to the ring compounds, or to the simple amines should merely introduce a "moiety diluent" effect. For example, N-n.butyl-2-pyrrolidone and n.octylamine are expected to exhibit synergism, but to a lesser degree than that of the simpler counterparts. The beneficial effect of using isopropylamine instead of n.butylamine is shown by the comparison of varnish/sludge removal of Formulae 72 and 73.

| INGREDIENTS* | FORMULA 72 | FORMULA 73 |
|---|---|---|
| N-Methyl-2-pyrrolidone | 20% | 20% |
| n.Butylamine | 4% | — |
| Isopropylamine | — | 4% |
| Isopar C (Exxon, Inc.) Mainly iso-$C_{7-8}$-paraffinics | 66% | 66% |
| Methyl-t.butylether | 10% | 10% |
| CSPIT RESULTS | | |
| Removal of light varnish/sludge | 35% | 75% |
| Removal of carbonized varnish/sludge | 20% | 55% |

*Tramp water of Formula 69, 72 and 73 estimated as 0.3%. (None was specifically added.)

The following two formulae illustrate the value of added water in improving cleaning efficacy.

| INGREDIENTS | FORMULA 69 | FORMULA 82 |
|---|---|---|
| N-Methyl-2-pyrrolidone | 20.5% | 20.0% |
| n.Butylamine | 5.0% | 5.0% |
| Water | 0.3% | 1.4% |
| Isopar C (Exxon, Inc.) Mainly iso-$C_{7-8}$-paraffinics | 65.2% | 62.8% |
| Isopropanol (Anhydrous) | — | 10.8% |
| Methyl t.butylether | 9.0% | — |
| pH Value (25° C.) | 12.6 | 13.0 |
| CSPIT RESULTS | | |
| Removal of heavy varnish/sludge | 50% | — |
| Removal of light varnish/sludge | 90% | 93% |
| Removal of carbonized varnish/sludge | 50% | 60% |
| REDUCTION OF TAILPIPE EMISSIONS** | | |
| Unburned hydrocarbon fuel | 81% & 81% | 91%, 52% & 92% |
| Carbon Monoxide | 88% & 86% | 65%, 57% & 90% |

**These percentage indicate the reduction of varnish/sludge from the amounts present prior to cleaning.

The composition of matter may further comprise an additive selected from the group consisting of lower alkyl alcohols, lubricants, and ethers. Lower alkyl alcohols are to include but not be limited to $C_1$ to $C_6$ aliphatic alcohols.

In another embodiment, the composition of matter further comprises anhydrous ammonia or ammonium hydroxide, more preferably in combination with triethylamine. Most preferably, the triethylamine is present in a concentration of greater than about 10%. Typically, this mixture comprises about 25 per cent of the formula. Since it is necessary to have the engine running during the injection and cleaning phase (approximately five minutes), a suitable fuel is included in all finished formulations. Various gasolines may be used, but for improved performance and better product uniformity, the use of a specific commercial mixture of predominantly isomeric isooctanes is recommended. The final ingredient is a simple aliphatic alcohol, used as a co-solvent to enable the inclusion of a higher level of water before phase separation occurs. Up to about ten per cent of other ingredients may be included as lubricants or for other non-essential purposes.

The subject invention provides in a most preferred embodiment, a three-component, mutually synergistic blend, having a high pH value (typically about 13.0) which, when dissolved in a suitable fuel base, may be injected into engines to perform a cleaning function that is dramatically superior to that of any known product. One composition demonstrating three-way synergism without water or aqueous ammonia comprises isopropylamine, tetrahydrofuran and hydrazine monohydrate in a 2:1:1 ratio.

In one embodiment, a delivery system is required to inject the undiluted composition directly into the upper cylinder areas so that it contacts and dissolves baked-on partly carbonized varnishes and sludge deposits. The concentrate is filled into an aerosol container (dispenser), after which the dispenser is fitted with a suitable valve, sealed and pressurized with a gas. A supplementary transfer system, consisting of a tube and other components, is then used to inject the product into the engine while it is operating at approximately 2000 rpm. One such system for supplying the pressurized composition is described in U.S. Pat. No. 4,807,578, issued Feb. 28, 1989.

The subject invention also provides for a pressurized dispenser comprising an amount of the above-described composition and a gas propellant.

The propellant may be selected from the group consisting of nitrogen, air, helium, and nitrous oxide. The dispenser is then pressurized to about 25–180 psi-g at 70° F. Nitrogen is preferred because it is inexpensive, non-toxic, develops the more preferred pressure range of from about 40 to about 120 psi-g at 70° F., according to the quantity added per can, and does not unduly dilute the concentrate. Additionally, it prevents vapor-lock caused by certain alternative propellants. Alternatively, the dispenser is a bag within a can type dispenser such as SEPRO-CAN manufactured by the Continental Can Division of the U.S. Can Company. A concentrate comprising one of the compositions of the subject invention is placed in the bag within the can and the area between the bag and the can is then pressurized by the addition of a gas. For satisfactory operation of the product, the gas must be of a low-pressure, liquifiable type, such as iso-butane.

Below are listed preferred dispensers. The percent by weight of the components within the dispenser are those which are preferred. However, these amounts are not to be construed as limiting.

One preferred dispenser comprises about 35.0% by weight of N-methyl-2-pyrrolidone; 15.0% by weight of diethylamine; 49.0% by weight of iso-$C_{7-8}$-paraffinics; 0.5% by weight of deionized water; and 0.5% by weight of nitrogen gas.

Also provided for is a dispenser which comprises about 35.0% by weight of N-methyl-2-pyrrolidone; 15.0% by weight of isopropylamine; 48.5% by weight of iso-$C_{7-8}$-paraffinics; 1.1% by weight of deionized water; and 0.4% by weight of nitrogen gas.

The dispenser may also comprise about 30.0% by weight of tetrahydrofuran; 10.0% by weight of n.butylamine; 49.0% by weight of iso-$C_{7-8}$-paraffinics; 0.5% by weight of deionized water; 10.0% by weight of methyl t.butylether; and 0.5% by weight of nitrogen gas.

Yet another dispenser comprises about 25.0% by weight of 4-butyrolactone; 12.0% by weight of n.pentylamine; 41.0% by weight of unleaded gasoline; 1.0% by weight of deionized water; 10.0% by weight of iso-propanol (anhydrous); 10.0% by weight of methyl t.butylether; 0.5% by weight of lubricating oil; and 0.5% by weight of nitrogen gas.

Another dispenser comprises about 18.0% by weight of toluene; 22.0% by weight of n.butylamine; 10.0% by weight of unleaded gasoline; 44.3% by weight of n.$C_{9-10}$-paraffinics; 1.2% by weight of deionized water; 3.9% by weight of methanol (99.5%); and 0.6% by weight of nitrogen gas.

A further dispenser comprises about 30.0% by weight of hydrazine monohydrate; 15.0% by weight of N-methyl-2-pyrrolidone; 42.5% by weight of iso-$C_{7-8}$-paraffinics; 12.0% by weight of ethanol (anhydrous); and 0.5% by weight of nitrogen gas.

Another preferred dispenser comprises about 16.0% by weight of mixed isometric xylenes; 24.0% by weight of diethylamine; 49.0% by weight of unleaded gasoline; 0.8% by weight of deionized water; 9.7% by weight of n.propanol; and 0.5% by weight of nitrogen gas.

A further dispenser comprises about 5.0% by weight of N-methyl-2-pyrrolidone; 10.0% by weight of triethylamine; 18.0% by weight of isopropanol (anhydrous); 4.0% by weight of xylene-based proprietary lubricant; 10.0% by weight of toluene or xylenes; 49.3% by weight of iso-($C_{7-8}$)-isoparaffinics; 3.0% by weight of ammonium hydroxide (28%); and 0.7% by weight of nitrogen gas.

Finally, a dispenser which comprises about 10.0% by weight of N-methyl-2-pyrrolidone; 22.2% by weight of 2-pyrrolidone-1-hydrate; 30.0% by weight of xylenes or toluene; 4.0% by weight of isopropanol (anhydrous); 15.0% by weight of methyl t.butylether; 2.0% by weight of ammonium hydroxide (28%); 1.7% by weight of deionized water; 0.5% by weight of Dowfax 2A1 surfactant; 14.0% by weight of triethylamine; and 0.6% by weight of nitrogen gas is provided for.

The subject invention also provides a method of dissolving varnish and burned-on sludge in an internal combustion engine which comprises mixing the subject composition with suitable engine fuel to form an admixture and contacting the fuel-exposed areas of the engine with the admixture under conditions such that the varnish and burned-on sludge is dissolved. This may be accomplished by any of the methods known to one skilled in the arts, and is to include, but not be limited to applying the admixture in an aerosol form directly to the fuel line without seriously disturbing the engines normal fuel line connection.

It is recognized that variations in these and related formulae and factors could readily be made within the concepts taught herein. Hence, the invention is intended to be limited only by the scope of the claims and reasonable equivalents thereof. The following Experimental Detail section is provided to better illustrate the subject invention, and is not to be construed as limiting the subject invention.

EXPERIMENTAL DETAIL

EXAMPLE 1

An automotive engine injector type cleaner having the composition:

| | |
|---|---|
| N-Methyl-2-pyrrolidone | 35.0% |
| Diethylamine | 15.0% |
| Iso-$C_{7-8}$-paraffinics | 49.0% |
| Deionzed Water | 0.5% |
| Nitrogen | 0.5% | was prepared by mixing the first three ingredients and then adding water to the point of incipient phase separation. After that the concentrate was packaged and the dispenser gassed with nitrogen propellant. The pH value of the concentrate was 12.5 at 25° C. Removal of varnish/sludge spark plug contaminants by the CSPIT test was 55% for heavy soils, 98% for light soils and 40% for carbonized soils.

EXAMPLE 2

An automotive engine injector type cleaner having the composition:

| | |
|---|---|
| N-Methyl-2-pyrrolidone | 35.0% |
| Isopropylamine | 15.0% |
| Iso-$C_{7-8}$-paraffinics | 48.5% |
| Deionzed Water | 1.1% |
| Nitrogen | 0.4% | was prepared as above. The pH value of the concentrate was 12.8 at 25° C. before adding the water, and 13.4 at 25° C. after adding the water. Removal of varnish/sludge spark plug contaminants by the CSPIT test was 55% for heavy soils, 98% for light soils and 60% for carbonized soils. This formula was higher in pH and judged more effective in soil removal than Example 1.

EXAMPLE 3

An automotive engine injector type cleaner having the composition:

| | |
|---|---|
| Tetrahydrofuran (THF) | 30.0% |
| n.Butylamine | 10.0% |
| Iso-$C_{7-8}$-paraffinics | 49.0% |
| Deionzed Water | 0.5% |
| Methyl t.butylether | 10.0% |
| Nitrogen | 0.5% | can be prepared by mixing the ingredients, except water and nitrogen, then adding the water to the point of incipient phase separation. Package and gas with nitrogen propellant. The pH value of the concentrate is 12.6 at 25° C.

EXAMPLE 4

An automotive engine cleaner of the injection type having the composition:

|  |  |
|---|---|
| Butyrolactone | 25.0% |
| n.Pentylamine | 12.0% |
| Unleaded Gasoline | 41.0% |
| Deionized Water | 1.0% |
| Isopropanol (Anhydrous) | 10.0% |
| Methyl t.butylether | 10.0% |
| Lubricating Oil | 0.5% |
| Nitrogen | 0.5% | can be prepared by combining all the ingredients except water and nitrogen gas, then adding the required amount of water. Package and gas with nitrogen propellant.

EXAMPLE 5

|  |  |
|---|---|
| Toluene | 18.0% |
| n.Butylamine | 22.0% |
| Unleaded Gasoline | 10.0% |
| n.$C_{9-10}$-paraffinics | 44.3% |
| Deionzed Water | 1.2% |
| Methanol - 99.5% | 3.9% |
| Nitrogen | 0.6% | can be prepared by combining all the ingredients, but adding the water last; then gassing with the nitrogen propellant.

EXAMPLE 6

An automotive engine cleaner of the injection type having the composition:

|  |  |
|---|---|
| Hydrazine Monohydrate | 4.0% |
| N-Methyl-2-pyrrolidone | 10.0% |
| Iso-$C_{7-8}$-paraffinics | 63.0% |
| Isopropanol | 12.0% |
| Toluene | 10.0% |
| Dowfax 2Al | 0.5% |
| Nitrogen | 0.5% | can be prepared by mixing items except hydrazine; then adding hydrazine and gas. This composition provides a soil removal rating of 10 (see the discussion hereinbelow).

EXAMPLE 7

An automotive injector type cleaner having the composition:

|  |  |
|---|---|
| Mixed Isomeric Xylenes | 16.0% |
| Diethylamine | 24.0% |
| Unleaded Gasolines | 49.0% |
| Deionized Water | 0.8% |
| n.Propanol | 9.7% |
| Nitrogen | 0.5% | can be prepared by combining all the ingredients except water and nitrogen, then adding the water and gassing with nitrogen propellant.

EXAMPLE 8

An automotive engine injector type cleaner having the composition:

|  |  |
|---|---|
| N-Methyl-2-pyrrolidone | 5.0% |
| Triethylamine | 10.0% |
| Isopropanol (Anhydrous) | 18.0% |
| Xylene-based lubricant | 4.0% |
| Toluene (or Xylenes) | 10.0% |
| Iso-($C_{7-8}$)-isoparaffinics | 49.3% |
| Ammonium Hydroxide (28%) | 3.0% |
| Nitrogen | 0.7% | can be prepared by combining all of the ingredients, except triethylamine and ammonium hydroxide (28% $NH_3$), in any order, followed by addition of these two ingredients in any order. The dispenser is then sealed and gassed with nitrogen to the desired equilibrium pressure.

This formula is typical of those found to be satisfactory with the recently introduced fluorosilicone automotive gaskets, as well as all others. The compatibility with the fluorosilicone elastomers is based on the use of not more than 10% N-methyl-2-pyrrolidone, and the use of a tertiary aliphatic amine, instead of primary and/or secondary simple aliphatic amines. The water content of this formula is 2.16%. The water is rendered soluble by the use of 18.0% isopropanol, in this case, as a co-solvent.

EXAMPLE 9

An automotive engine injector type cleaner having the composition:

|  |  |
|---|---|
| N-Methyl-2-pyrrolidone | 10.0% |
| 2-Pyrrolidone 1-Hydrate | 22.2% |
| Xylenes or Toluene | 30.0% |
| Isopropanol (Anhydrous) | 4.0% |
| Methyl tertiary Butyl Ether | 15.0% |
| Ammonium Hydroxide (28%) | 2.0% |
| Deionized Water | 1.7% |
| Dowfax 2Al surfactant | 0.5% |
| Triethyl amine | 14.0% |
| Nitrogen | 0.6% | can be prepared as indicated in Example 7.

This formula is cited to show that the usual iso-($C_7$-$C_8$)-paraffinic solvent or diluent may be replaced by other liquids of high fuel value. It has a pH of 11.5 at 77° F. and exceptional soil removal capabilities. Gaskets such as EPDM-70, Buna-N and the fluorosilicones are swelled slightly during typical use conditions, but no degradational effects, such as mushing or delamination have been noted.

EXAMPLE 10

Automobile engine cleaners having the composition:

|  | 213A | 214A |
|---|---|---|
| 2-Pyrrolidone-1-hydrate | 10.0 | 14.416 |
| N-Methyl-2-pyrrolidone | 12.0 | 9.614 |
| Triethylamine | 10.0 | 14.416 |
| Isopropanol | 15.5 | 14.600 |
| Methyl t.butyl ether | 5.8 | 5.188 |
| Xylene | 9.0 | — |
| Dowfax 2Al | 0.5 | 0.485 |
| Ammonium hydroxide (28%) | 2.2 | 2.881 |
| Isopar "C" | 35.0 | — |
| Regular unleaded gasoline | — | 38.400 | have been shown to be highly effective against coke and burned and sludge. (All numbers are expressed in % by weight of the composition).

EXAMPLE 11

An automotive engine injector/valve type cleaner having the composition:

| | |
|---|---|
| N-Methyl-2-pyrrolidone | 8.0% |
| Furfurylamine | 2.0% |
| Isopropanol | 12.0% |
| Toluene | 10.0% |
| Hydrazine Monohydrate | 4.0% |
| Iso-($C_7$-$C_8$)-isoparaffinics | 63.0% |
| Dowfax 2A1 | 0.5% |
| Nitrogen | 0.5% | can be prepared as indicated in Example 7.

This formula demonstrates a 10 soil removal rating (see discussion hereinbelow).

EXPERIMENTAL RESULTS

Synergistic solvent blends for cleaning spark plugs and upper cylinder areas where tested by injection into automotive gasoline and diesel engines. Baked on residue removal by individual solvents, binary solvent blends and fully formulated concentrate blends, when applied to areas around the automotive spark plug gap for about five minutes are reported below. An arbitrary scale of soil removal is provided. The scale ranges from 0 (No soil removal) to 10 (total soil removal).

| INDIVIDUAL SOLVENTS | | | | | | | | | | |
|---|---|---|---|---|---|---|---|---|---|---|
| Formula Number: | 001 | 002 | 003 | 004 | 005 | 006 | 007 | 008 | 009 | 010 |
| Hydrazine | 100 | — | — | — | — | — | — | — | — | — |
| Diethylene Triamine | — | 100 | — | — | — | — | — | — | — | — |
| n.Butylamine | — | — | 100 | — | — | — | — | — | — | — |
| Diethylamine | — | — | — | 100 | — | — | — | — | — | — |
| Triethylamine | — | — | — | — | 100 | — | — | — | — | — |
| Tetrahydrofuran | — | — | — | — | — | 100 | — | — | — | — |
| N-Methyl-2-pyrrolidone | — | — | — | — | — | — | 100 | — | — | — |
| Butyrolactone | — | — | — | — | — | — | — | 100 | — | — |
| Dibutylamine | — | — | — | — | — | — | — | — | 100 | — |
| Ethylene Glycol n. Butyl Ether (As Dowanol DB) | — | — | — | — | — | — | — | — | — | 100 |
| Soil Removal | 8.0 | 1.0 | 6.0 | 3.5 | 0.3 | 1.0 | 1.5 | 0.5 | 0.3 | 0.1 |

| INDIVIDUAL AND BINARY SOLVENTS | | | | | | | | | | |
|---|---|---|---|---|---|---|---|---|---|---|
| Formula Number: | 011 | 012 | 013 | 014 | 015 | 016 | 017 | 018 | 019 | 020 |
| Lubrizol 8166 Mixture | 100 | — | — | — | — | — | — | — | — | — |
| Toluene | — | 100 | — | — | — | — | — | — | — | — |
| Methyl Ethyl Ketone | — | — | 100 | — | — | — | — | — | — | — |
| n.Butyl Acetate | — | — | — | 100 | — | — | — | — | — | — |
| Methylene Chloride | — | — | — | — | 100 | — | — | — | — | — |
| iso.Propylamine | — | — | — | — | — | 100 | — | — | — | — |
| N-Methyl-2-pyrrolidone | — | — | — | — | — | — | — | 25 | 50 | 75 | 90 |
| n.Butylamine | — | — | — | — | — | — | 75 | 50 | 25 | 10 |
| Soil Removal | 0.1 | 0.2 | 0.1 | 0.1 | 0.0 | 5.0 | 5.0 | 9.3 | 9.7 | 9.0 |

The strong synergism in the N-Methyl-2-pyrrolidone/n.Butylamine system is shown by Formulae Nos. 017–020.

| Formula Number: | 021 | 022 | 023 | 024 | 025 | 026 | 027 | 028 | 029 | 030 |
|---|---|---|---|---|---|---|---|---|---|---|
| N-Methyl-2-pyrrolidone | 95 | — | — | — | — | — | 25 | 50 | 75 | 90 |
| n.Butylamine | 5 | 75 | 50 | 25 | 10 | 5 | — | — | — | — |
| Tetrahydrofuran (THF) | — | 25 | 50 | 75 | 90 | 95 | — | — | — | — |
| Diethylamine | — | — | — | — | — | — | 75 | 50 | 25 | 10 |
| Soil Removal | 1.3 | 2.5 | 7.0 | 7.0 | 7.0 | 1.0 | 7.5 | 8.0 | 8.0 | 8.0 |

The strong synergism of the Tetrahydrofuran/n.Butylamine system is shown by Formulae Nos. 023–025.

| Formula Number: | 031 | 032 | 033 | 034 | 035 | 036 | 037 | 038 | 039 | 040 |
|---|---|---|---|---|---|---|---|---|---|---|
| N-Methyl-2-pyrrolidone | 95 | — | — | — | — | — | 25 | 50 | 75 | 90 |
| n.Butylamine | — | 75 | 50 | 25 | 10 | 5 | — | — | — | — |
| 4-butyrolactone | — | 25 | 50 | 75 | 90 | 95 | — | — | — | — |
| Diethylamine | 5 | — | — | — | — | — | — | — | — | — |
| Isopropylamine | — | — | — | — | — | — | 75 | 50 | 25 | 10 |
| Soil Removal | 1.0 | 4.0 | 7.0 | 7.0 | 4.0 | 1.0 | 2.5 | 6.0 | 8.5 | 8.0 |

Strong synergism of Tetrahydrofuran/Diethylamine is shown by Formulae Nos. 027–030.

Moderate synergism of 4-Butyrolactone/n.Butylamine is shown by Formulae Nos. 033–034.

Strong synergism of N-Methyl-2-pyrrolidone/iso.-Propylamine is shown by Formulae Nos. 038–041.

Strong synergism of the 2-Pyrrolidone/Triethylamine/NH3 is shown by Formulae Nos. 191 and 193–196.

Modest synergism of Ethylene Glycol n.Butyl Ether/n.Butylamine is shown by Formulas No. 047–051.

| Formula Number: | 061 | 062 | 063 | 064 | 065 | 066 | 066 067+ | 068 | 069 | 070 | 071 |
|---|---|---|---|---|---|---|---|---|---|---|---|
| N-Methyl-2-pyrrolidone | — | — | — | — | — | — | 20 | 20 | 20 | 21 | 21 | 21 |
| n.Butylamine | 5 | 75 | 50 | 25 | 10 | 5 | 10 | — | — | 5 | — | — |
| Iso-($C_{7-8}$)-paraffinics | — | 25 | 50 | 75 | 90 | 95 | 61 | 61 | 61 | 61 | 61 | 61 |
| Methyl tert. butyl ether | 95 | — | — | — | — | — | 9 | 9 | 9 | 9 | 9 | 9 |
| Isopropylamine | — | — | — | — | — | — | — | 10 | — | — | 5 | — |
| Diethylamine | — | — | — | — | — | — | — | — | 10 | — | — | 5 |
| Soil Removal | 0.0 | 4.0 | 4.0 | 2.0 | 1.0 | 0.0 | 3.3 | 5.0 | 5.8 | 2.7 | 5.2 | 4.2 |

No synergism exists for iso-($C_n$)-Paraffinics/n-Butylamine system, as shown by Formulae Nos. 062–066.

Variable, but non-measurable amounts of water in the

| Formula Number: | 041 | 042 | 043 | 044 | 045 | 046 | 047 | 048 | 049 | 050 |
|---|---|---|---|---|---|---|---|---|---|---|
| N-Methyl-2-pyrrolidone | 95 | — | — | — | — | — | — | — | — | — |
| n.Butylamine | — | 75 | 50 | 25 | 10 | 5 | 75 | 50 | 25 | 10 |
| Toluene | — | 25 | 50 | 75 | 90 | 95 | — | — | — | — |
| Isopropylamine | 5 | — | — | — | — | — | — | — | — | — |
| Ethylene Glycol n.butyl ether (As Dowanol EB) | — | — | — | — | — | — | 25 | 50 | 75 | 90 |
| Soil Removal | 7.0 | 7.5 | 8.8 | 5.0 | 1.5 | 0.5 | 6.0 | 1.8 | 1.8 | 1.8 |

Strong synergism of Toluene/n.Butylamine is shown by Formulae Nos. 042–044.

amine affect results significantly. The amount of water in the listed formulations is thought to be about 0.5 to

| Formula Number: | 051 | 052 | 053 | 054 | 055 | 056 | 057 | 058 | 059 | 060 |
|---|---|---|---|---|---|---|---|---|---|---|
| Lubrizol 8163 Mixture | — | 25 | 50 | 75 | 90 | 95 | — | — | — | — |
| n.Butylamine | 5 | 75 | 50 | 25 | 10 | 5 | 75 | 50 | 25 | 10 |
| Methyl tert. butyl ether | — | — | — | — | — | — | 25 | 50 | 75 | 90 |
| Ethylene glycol n.butyl ether (As Dowanol EB) | 95 | — | — | — | — | — | — | — | — | — |
| Soil Removal | 0.5 | 7.5 | 5.0 | 5.0 | 2.0 | 1.0 | 4.0 | 3.0 | 2.0 | 1.5 |

1.0%. There are two formulae identified as 066; cited here as 066 and 066+

| | RESIDUE REMOVAL BY FORMULATED SOLVENT BLENDS, WHEN APPLIED TO AREAS AROUND THE AUTOMOTIVE SPARK PLUG GAP FOR FIVE MINUTES AGAINST THREE TYPES OF SLUDGE DEPOSITS TESTED | | | | | |
|---|---|---|---|---|---|---|
| NO. | CHEMICAL NAME | % | SLUDGE A | SLUDGE B | SLUDGE C | AVG |
| 077. | N-Methyl-2-pyrrolidone | 35.0 | | | | |
| | n.Butylamine | 15.0 | 55 | — | — | 55 |
| | Iso-($C_{7-8}$)-paraffinics | 49.84 | | | | |
| | Deionized Water | 0.16 | | | | |
| | pH = 12.8 | | | | | |
| 078. | N-Methyl-2-pyrrolidone | 20.5 | | | | |
| | n.Butylamine | 5.0 | 50 | 90 | 50 | 63 |
| | Iso-(C7-8)-paraffinics | 65.2 | | 95 | | |
| | Methyl t.butyl ether | 9.0 | | | | |
| | Deionized Water | 0.3 | | | | |
| 079. | N-Methyl-2- | 35.00 | | | | |

-continued

| | RESIDUE REMOVAL BY FORMULATED SOLVENT BLENDS, WHEN APPLIED TO AREAS AROUND THE AUTOMOTIVE SPARK PLUG GAP FOR FIVE MINUTES AGAINST THREE TYPES OF SLUDGE DEPOSITS TESTED | | | | | |
|---|---|---|---|---|---|---|
| NO. | CHEMICAL NAME | % | SLUDGE A | SLUDGE B | SLUDGE C | AVG |
| | pyrrolidone | | | | | |
| | n.Butylamine | 15.00 | — | 98 | 60 | 79 |
| | Iso-(C$_{7-8}$)- | 48.97 | 55 | 98 | 50 | 60 |
| | Water | 1.03 | | | | |
| | pH = 13.2 | | | | | |
| 080. | N-Methyl-2- | 35.00 | | | | |
| | pyrrolidone | | | | | |
| | Isopropylamine | 15.00 | — | 98 | 60 | 79 |
| | Iso-(C$_{7-8}$)- | 48.89 | 55 | 98 | 60 | 71 |
| | paraffinics | | | | | |
| | Water | 1.11 | | | | |
| | pH = 13.0 | | | | | |
| 081. | N-Methyl-2- | 35.00 | | | | |
| | pyrrolidone | | | | | |
| | Diethylamine | 15.00 | — | 90 | 50 | 70 |
| | Iso-(C$_{7-8}$)- | 49.50 | 55 | 98 | 40 | 64 |
| | Water | 0.50 | | | | |
| | pH = 12.5 | | | | | |
| 069. | A.N-Methyl-2- | 20.00 | | | | |
| | pyrrolidone | | | | | |
| | n.Butylamine | 5.0 | | | | |
| | Iso-(C7-8)- | 63.0 | 50 | 93 | 50 | 63 |
| | paraffinics | | | | | |
| | Isopropanol | 11.7 | | | | |
| | (Anhyd.) | | | | | |
| | Water | 0.3 | | | | |
| | pH = 13.0 | | | | | |
| 082. | N-Methyl-2- | 20.0 | | | | |
| | pyrrolidone | | | | | |
| | n.Butylamine | 5.0 | — | 90 | | |
| | Iso-(C$_{7-8}$)- | 62.8 | — | 95 | 60 | 76 |
| | paraffinics | | | | | |
| | Isopropanol | 10.8 | | | | |
| | (Anhyd.) | | | | | |
| | Water | 1.4 | | | | |
| | pH = 13.0 | | | | | |

Sludge A: A heavy crust of burned-on oil sludge.
Sludge B: A light crust of burned-on oil sludge.
Sludge C: Black carbonized deposit of sludge.

| RESIDUE REMOVAL BY FORMULATED SOLVENT BLENDS, WHEN APPLIED TO AREAS AROUND THE AUTOMOTIVE SPARK PLUG GAP FOR FIVE MINUTES COMPARISON OF THE FORMULAE FOR THOSE BLENDS EXHIBITING AT LEAST 80% SOIL REMOVAL (AV.) | | | | | | | | | | |
|---|---|---|---|---|---|---|---|---|---|---|
| Formula Number: | 79 | 92D | 94 | 201 | 207 | 214 | 215 | 217 | 221 | 222 |
| N-Methyl-2 pyrrolidone | 35 | 5 | 5 | 10 | 10 | 10 | 10 | 10 | 10 | 10 |
| 2-Pyrrolidone 1-Hydrate | — | — | — | — | — | — | — | — | 25 | — |
| Tetrahydrofuran | — | — | — | — | — | — | — | — | — | — |
| 4-Butyrolactone | — | — | — | 40 | 26 | 24 | 24 | 25 | — | — |
| Toluene | — | — | — | — | — | — | — | — | — | 10 |
| Mixed Xylene Isomers | — | — | — | 30 | 30 | 30 | 30 | 30 | 29 | — |
| Aromatic 150 | — | — | — | — | — | — | — | — | 10 | — |
| Hydrazine Monohydrate | — | — | — | — | — | — | — | — | — | 4 |
| Triethylamine | — | 10 | 10 | 9 | 14 | 12 | 10 | 14 | 20 | — |
| Iso-(C$_{7-8}$)- paraffinics | 49 | 67 | 64 | — | — | — | — | — | — | 63.5 |
| 2-Nitropropane | — | — | — | — | — | — | — | — | — | — |
| Water | 1 | — | — | — | — | — | — | — | — | — |
| Ammonium Hydroxide (29%) | — | 3 | 3 | 1 | 1 | 2 | 3 | 2 | 2 | — |
| Isopropanol | — | 15 | 18 | — | 4 | 7 | 8 | 4 | 4 | 12 |
| Methyl tert. butyl ether | — | — | — | 10 | 15 | 15 | 15 | 15 | — | — |
| Dowfax 2Al | — | — | — | — | — | — | — | — | — | 0.5 |
| Soil Removal | 8.0 | 8.0 | 8.5 | 8.3 | 8.3 | 8.3 | 8.0 | 8.1 | 8.3 | 10.0 |
| pH Value (25° C.) | | | | | | 11.0 | | 11.3 | | |

FUEL INJECTOR CLEANING BY FORMULA 214A

Formula 214A

| | |
|---|---|
| 2-Pyrrolidone-1-Hydrate | 14.416% |
| N-Methyl-2-pyrrolidone | 9.614% |
| Triethylamine | 14.416% |
| Isopropanol | 14.600% |
| Methyl tert.butyl ether | 5.188% |
| Dowfax 2A1 | 0.485% |
| Ammonium hydroxide 28° Be' | 2.881% |
| Regular unleaded gasoline | 38.400% |

After treatment of fuel injectors with formula 214A the following results were obtained.

| Injector # | Before Cleaning | After Cleaning | % Increase |
|---|---|---|---|
| 1 | 2.97 cc/sec | 4.86 cc/sec | 63.72 |
| 2 | 2.43 cc/sec | 4.94 cc/sec | 103.29 |
| 3 | 4.775 cc/sec | 4.985 cc/sec | 4.395 |
| 4 | 0.21 cc/sec | 5.05 cc/sec | 2304.76 |
| | New injector = 4.8–5.00 cc/sec | | |

Accordingly, treatment with formula 214A dramatically increases flow through fuel injectors. As shown above, the flow rate after treatment approaches the flow rate through a new injector.

The following chart shows the superior cleaning results obtained by treatment with formula 214A compared with other commercially available cleaners.

| Injector # | Product Tested | Flow Before Cleaning | Injector Flow After Cleaning | % Increase |
|---|---|---|---|---|
| 1. | CHAMPION INJECTOR CLEANER | 2.68 cc/sec | 2.68 cc/sec | 0 |
| 2. | B.G. INJECTOR CLEANER | 2.66 cc/sec | 2.74 cc/sec | 3.0 |
| 3. | FORMULA #214A | 2.15 cc/sec | 3.24 cc/sec | 50.7 |
| 1. | CLEANING W/ CHAMPION FOLLOWED BY FORMULA #214A | 2.68 cc/sec | 3.30 cc/sec | 23.1 |
| 2. | CLEANING W/ B.G. FOLLOWED BY FORMULA #214A | 2.74 cc/sec | 3.25 cc/sec | 18.6 |
| | New injector 3.25 cc/sec | | | |

As show above, formula 214A significantly increases flow through fuel injectors and is vastly superior to commercially available fuel injector cleaners.

The following chart shows the reduction in hydrocarbons released following treatment of an engine with formula 214A.

| | IDLE | HIGH CRUISE | LOW CRUISE |
|---|---|---|---|
| 1. Hydrocarbon emissions readings before the catalytic converter. | | | |
| a. Before cleaning | 175 ppm | | |
| b. After cleaning | 60 ppm | | |
| c. After driving | | | |
| * 195 miles (no fuel added to the tank) | 58 ppm | | |
| d. After driving | | | |
| ** 477.5 miles | 41 ppm | | 38 ppm |
| 2. Hydrocarbon emissions readings after the catalytic converter. | | | |
| a. Before cleaning | 31 ppm | | |
| b. After cleaning | 10 ppm | | |
| c. After driving | | | |
| * 195 miles | 9 ppm | | |
| d. After driving | | | |
| ** 477.5 miles | 9 ppm | | 3 ppm |
| 3. Carbon monoxide emissions readings before the catalytic converter. | | | |
| a. Before cleaning | 3.56% | | |
| b. After cleaning | .59% | | |
| c. After driving | | | |
| * 195 miles | .52% | | |
| d. After driving | | | |
| ** 477.5 miles | .42% | | .43% |
| 4. Carbon monoxide emissions readings after the catalytic converter. | | | |
| a. Before cleaning | .06% | | |
| b. After cleaning | .03% | | |
| c. After driving | | | |
| * 195 miles | .03% | | |
| d. After driving | | | |
| ** 477.5 miles | .02% | | .04% |

* First re-check
** Second re-check was performed 12 days later.

In summary, formula 214A increases flow through fuel injectors, cleans injectors better than commercially available products, and reduces hydrocarbon and carbon monoxide both before and after the catalytic converter.

ANALYSIS OF FIGURES

| FIG. | BINARY BLEND | MAXIMUM CLEANING ACTIVITY (%) | AMINE CONCENTRATION AT POINT OF MINIMUM ACTIVITY (%) | AMINE CONCENTRATION AT POINT AT MAXIMUM SYNERGISM (%) | CLEANING ACTIVITY AT MAXIMUM SYNERGISM (%) | MAXIMUM SYNERGISTIC FACTOR* |
|---|---|---|---|---|---|---|
| 1. | N-Methyl-2-pyrrolidone + n.Butylamine | 97 | 30 | 10 | 90 | 4.5 |

-continued

ANALYSIS OF FIGURES

| FIG. | BINARY BLEND | MAXIMUM CLEANING ACTIVITY (%) | AMINE CONCENTRATION AT POINT OF MINIMUM ACTIVITY (%) | AMINE CONCENTRATION AT POINT AT MAXIMUM SYNERGISM (%) | CLEANING ACTIVITY AT MAXIMUM SYNERGISM (%) | MAXIMUM SYNERGISTIC FACTOR* |
|---|---|---|---|---|---|---|
| 2. | Tetrahydrofuran + n. Butyl amine | 71 | 30 | 10 | 70 | 5.2 |
| 3. | 4-Butyrolactone + n.Butyl amine | 71 | 38 | 15 | 62 | 6.8 |
| 4. | Toluene + n. Butylamine | 89 | 55 | 35 | 76 | 3.5 |

*Actual % cleaning divided by theoretical % cleaning; with concentration selected for maximum value.

What is claimed is:

1. A method of dissolving organic matter which comprises contacting the organic matter with a composition containing:
   (a) a primary, secondary or tertiary aliphatic amine selected from the group consisting of primary amines having a $C_{1-7}$ chain attached to the nitrogen atom, secondary amines having $C_{1-6}$ chains attached to the nitrogen atom, and tertiary amines having $C_{1-5}$ chains attached to the nitrogen atom; and
   (b) a hydrocarbon or substituted hydrocarbon compound selected from the group consisting of N-methyl-2-pyrrolidone, 2-pyrrolidone-1-hydrate, 1-vinyl-2-pyrrolidone, furfurylamine, furfuryl alcohol, 2-methylimidazole, 3-methyl-2-oxazolidinone, 2-methyl-2-oxazoline, 2-methylaziridine, tetramethylene sulfone, tetrahydrofuran and 4-butyrolactone;
   the compound and the amine being compatible with each other, capable of forming a homogeneous mixture, and present in synergistic amounts.

2. A method of claim 1, wherein the composition has a boiling point of greater than 100° F.

3. A method of claim 1, wherein the organic matter to be dissolved comprises varnish and burned on sludge in an internal combustion engine.

4. A method of claim 1, wherein the organic matter to be dissolved comprises bacteria, fungus, mold or mildew.

5. A method of claim 1, wherein the composition has a weight ratio of the aliphatic amine or hydrazine to the hydrocarbon or substituted hydrocarbon compound from 3:96 to 96:3.

6. A method of claim 1, wherein the aliphatic amine in the composition is a primary amine.

7. A method of claim 6, wherein the primary amine in the composition is n-butylamine or isopropylamine.

8. A method of claim 1, wherein the aliphatic amine in the composition is a secondary amine.

9. A method of claim 8, wherein the secondary amine in the composition is diethylamine.

10. A method of claim 1, wherein the aliphatic amine in the composition is a tertiary amine.

11. A method of claim 10, wherein the tertiary amine in the composition is triethylamine.

12. A method of claim 1, wherein the amine in the composition comprises from 5% to 75% by weight of the composition.

13. A method of claim 1, wherein the composition further comprises water in an amount effective to assist in dissolving organic matter.

14. A method of claim 13, wherein the water in the composition comprises less than 4.0% by weight of the composition.

15. A method of claim 14, wherein the water in the composition comprises less than 1.0% by weight of the composition.

16. A method of claim 1, wherein the composition further comprises an engine fuel.

17. A method of claim 16, wherein the engine fuel in the composition is selected from the group consisting of iso-$(C_{7-8})$-paraffinics, iso-$(C_{9-10})$ paraffinics, and gasoline.

18. A method of claim 1, wherein the composition further comprises an additive selected from the group consisting of lower alkyl alcohols, lubricants, and ethers.

19. A method of claim 1, wherein the composition further comprises ammonia or ammonium hydroxide.

20. A method of claim 1, wherein the composition further comprises triethylamine.

21. A method of claim 20, wherein the triethylamine in the composition is present in a concentration of greater than 10% by weight.

22. A composition for dissolving organic matter which comprises:
   (a) an aliphatic amine selected from the group consisting of n-butylamine, isopropylamine, diethylamine and triethylamine; and
   (b) a hydrocarbon or substituted hydrocarbon selected from the group consisting of N-methyl-2-pyrrolidone, 2-pyrrolidone-1-hydrate, 1-vinyl-2-pyrrolidone, furfurylamine, furfuryl alcohol, 2-methylimidzole, 3-methyl-2-oxazolidinone, 2-methyl-2-oxazoline, 2-methylaziridine, tetramethylenesulfone, tetrahydrofuran, and 4-butyrolactone;
   the compound and the amine being compatible with each other, capable of forming a homogeneous mixture, and present in synergistic amounts.

23. A method of dissolving organic matter which comprises contacting the organic matter with a composition containing:
   (a) a hydrazine; and
   (b) a hydrocarbon or substituted hydrocarbon compound selected from the group consisting of furfurylamine, furfuryl alcohol, 2-methylimidazole, 2-methyl-2-oxazoline, 2-methylaziridine, tetramethylene sulfone, tetrahydrofuran and 4-butyrolactone;
   the compound and the hydrazine being compatible with each other, capable of forming a homogeneous mixture, and present in synergistic amounts.

24. A composition for dissolving organic matter which comprises:
(a) a hydrazine; and
(b) a hydrocarbon or substituted hydrocarbon selected from the group consisting of N-furfurylamine, furfuryl alcohol, 2-methylimidzole, 2-methyl-2-oxazoline, 2-methylaziridine, tetramethylenesulfone, tetrahydrofuran, and 4-butyrolactone;

the compound and the hydrazine being compatible with each other, capable of forming a homogeneous mixture, and present in synergistic amounts.

* * * * *